US008509485B2

(12) United States Patent
Shinoyama et al.

(10) Patent No.: US 8,509,485 B2
(45) Date of Patent: Aug. 13, 2013

(54) INFORMATION PROCESSING APPARATUS AND INFORMATION PROCESSING METHOD FOR DRAWING IMAGE THAT REACTS TO INPUT INFORMATION

(75) Inventors: Noriaki Shinoyama, Tokyo (JP); Takashi Nozaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 247 days.

(21) Appl. No.: 13/154,791

(22) Filed: Jun. 7, 2011

(65) Prior Publication Data
US 2012/0027254 A1    Feb. 2, 2012

(30) Foreign Application Priority Data

Jul. 29, 2010 (JP) ................. 2010-170948

(51) Int. Cl.
*G06K 9/00*    (2006.01)
(52) U.S. Cl.
USPC ........... 382/103; 382/107; 382/291; 382/293; 358/1.5; 358/538
(58) Field of Classification Search
USPC ................. 382/103, 107, 165, 284, 291, 293; 358/1.5, 538, 540
See application file for complete search history.

(56) References Cited

U.S. PATENT DOCUMENTS

| 6,750,974 | B2 * | 6/2004 | Svetkoff et al. | 356/602 |
| 6,816,625 | B2 * | 11/2004 | Lewis et al. | 382/275 |
| 6,919,892 | B1 * | 7/2005 | Cheiky et al. | 345/473 |
| 7,027,054 | B1 * | 4/2006 | Cheiky et al. | 345/473 |
| 7,199,882 | B2 * | 4/2007 | Svetkoff et al. | 356/602 |

OTHER PUBLICATIONS

Andreas Kolb, et al., Dynamic Particle Coupling for GPU-based Fluid Simulation, Proc. 18th Symposium on Simulation Technique, pp. 722-727 (Sep. 2005).

* cited by examiner

*Primary Examiner* — Yosef Kassa
(74) *Attorney, Agent, or Firm* — Matthew B. Dernier, Esq.; Gibson & Dernier LLP

(57) ABSTRACT

In an information processing apparatus, an external-information acquisition unit acquires external information such as an image, a sound, textual information, and numerical information from an input apparatus. A field-image generation unit generates, as an image, a "field" that acts on a particle for a predetermined time step based on the external information. An intermediate-image memory unit stores an intermediate image that is generated in the process of generating a field image by the field-image generation unit. A field-image memory unit stores the field image generated by the field-image generation unit. A particle-image generation unit generates data of a particle image to be output finally by using the field image stored in the field-image memory unit.

18 Claims, 10 Drawing Sheets

170

172

174

176

INFORMATION PROCESSING APPARATUS AND INFORMATION PROCESSING METHOD FOR DRAWING IMAGE THAT REACTS TO INPUT INFORMATION

BACKGROUND OF THE INVENTION

1. Field of the Invention

The present invention relates to an information processing apparatus that generates an image with motion and to an information processing method used in the apparatus.

2. Description of the Related Art

A particle simulation technique for calculating the behavior of particles of smoke, clouds, etc., in a time-evolution manner and expressing the behavior as an image is used not only in an engineering application but also in a field of entertainment, art, or the like such as games, animation, and visual art. With this trend, many simulators have been suggested (for example, see Andreas Kolb, et al., Dynamic Particle Coupling for GPU-based Fluid Simulation, Proc. 18th Symposium on Simulation Technique, 2005, pages 722-727). For example, in particle simulation using CUDA (Computer Unified Device Architecture, registered trademark), space division and parallel computation allow a large amount of particles to be treated.

RELATED ART LIST

Andreas Kolb, et al., Dynamic Particle Coupling for GPU-based Fluid Simulation, Proc. 18th Symposium on Simulation Technique, 2005, pages 722-727

However, only limited types of processors can be applied in the above technique. In general, when performing a simulation in consideration of, for example, effects in response to various external forces or the attraction force between particles, it is necessary to solve, for all the particles, equations that are based on those factors. Therefore, an increase in the number of particles or a more realistic expression are directly linked to an increase in time and effort for programming and in load for arithmetic processing. When external forces change, it is more difficult to incorporate the change in the particles in terms of program architecture and arithmetic processing.

SUMMARY OF THE INVENTION

In this background, a purpose of the present invention is to provide an information processing technique that allows for various expressions with use of particles in an inexpensive and efficient manner.

One embodiment of the present invention relates to an information processing apparatus. The information apparatus that outputs image data where a particle is time-varied comprises: an input information acquisition unit configured to acquire time-varying input information; a field-image generation unit configured to generate, based on the input information, a field image in which a distribution of an attribute value for an attribute to be assigned to a particle is expressed in a two-dimensional space in which a particle exists for a predetermined timestep; and a particle rendering unit configured to acquire the attribute value of a particle from a field image based on a positional coordinate of the particle at a given time step and to render the particle at a subsequent time step in accordance with the attribute value.

Another embodiment of the present invention relates to an information processing method. The information processing method of outputting image data where a particle is time-varied comprises: acquiring time-varying input information; generating, based on the input information, a field image in which a distribution of an attribute value for an attribute to be assigned to a particle is expressed in a two-dimensional space in which a particle exists for a predetermined timestep and storing the field image in a memory; and acquiring the attribute value of a particle from each field image read out from the memory based on a positional coordinate of the particle at a given time step and rendering the particle at a subsequent time step in accordance with the attribute value.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
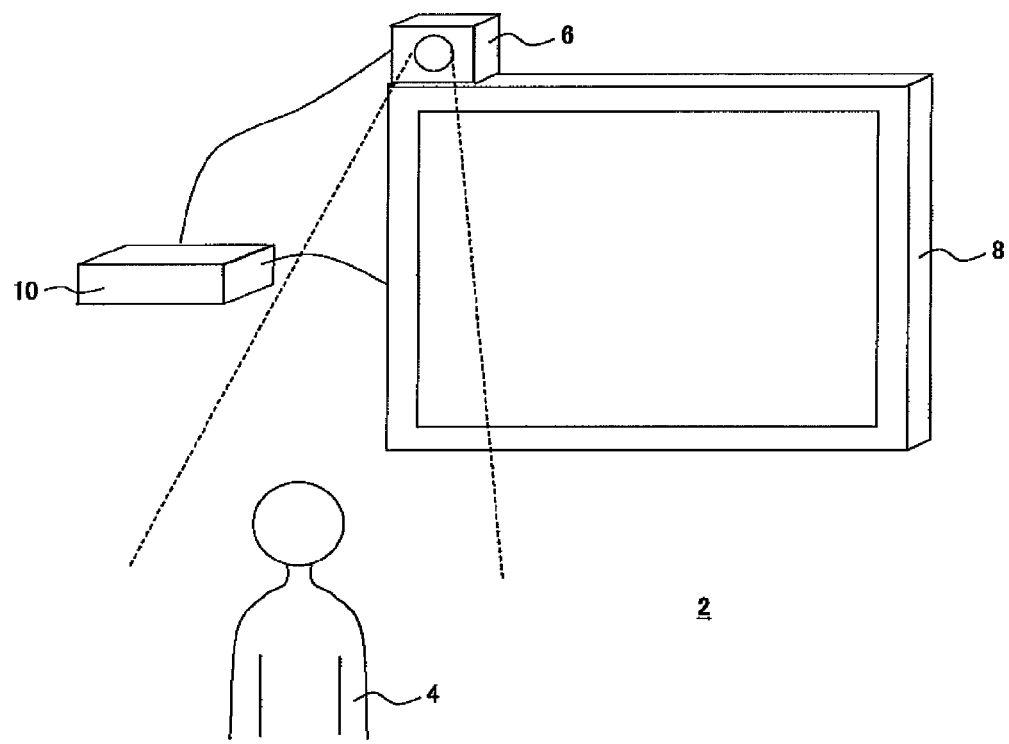
FIG. 1 is a diagram showing a configuration example of an information processing system to which an information processing technique in a present embodiment can be applied.

FIG. 1 shows a configuration example of an information processing system to which an information processing technique in a present embodiment can be applied. An information processing system 2 includes a camera 6 that captures an image of a user 4, an information processing apparatus 10 that acquires the image from the camera 6 and generates an image that responds to the motion of the user 4, and a display apparatus 8 that displays the image generated by the information processing apparatus 10.

The information processing apparatus 10 may be connected to the camera 6 and to the display apparatus 8 via wired cables or may be connected wirelessly via a wireless LAN (Local Area Network) or the like. Any two of or all of the camera 6, the information processing apparatus 10, and the display apparatus 8 may be integrally provided. The camera 6 may not necessarily be provided on the display apparatus 8. Further, the user 4 does not need to be a person, and the number thereof is not limited. The display apparatus 8 may be an apparatus that displays an image with use of a liquid crystal display or a plasma display alone or may be, for example, a combination of a projector for projecting an image and a screen.

The information processing apparatus 10 of the present embodiment generates an image including a particle that responds to external information on a real-time basis. The "external information" may be any information that can be electronically obtained by the information processing system 2. The movement of the user 4 is a type of the external information. In the present embodiment, the external information also includes a sound, textual information, numerical information, etc., as well as information (e.g., the movement of a person or an object) that can be expressed as an image. When the movement of the user 4 is specified as external information, an image can be generated, for example, where randomly scattered particles gather together to form the shape of the user 4 or follow the user 4.

When a sound is added as external information, an image can be generated, for example, where particles gathered in the shape of the user burst to scatter in response to the sound of hand clapping or float in accordance with music. As described above, an image that responds in accordance with various external changes is generated in the present embodiment by processing an image, a sound, textual information, numerical information, etc., in an integrated fashion.

Such an image can be applied in various fields related to arts and graphics, for example, installations that express arts in spaces, VJs (Video Jockey) who manage video images at a party or the like, media arts, screen savers, etc., as well as games and animations. Such an image can be also applied to the creation of crowd animations of birds, fish, insects, etc.

Figure 2:
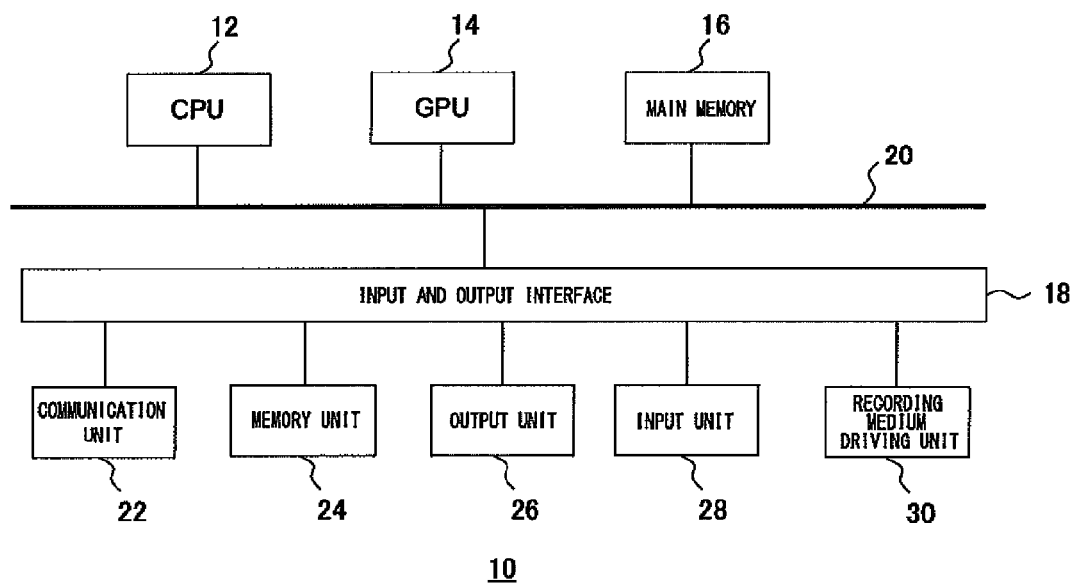
FIG. 2 is a diagram showing the configuration of an internal circuit of an information processing apparatus in the embodiment.

FIG. 2 shows the configuration of an internal circuit of an information processing apparatus 10. The information processing apparatus 10 includes a CPU (Central Processing Unit) 12, a GPU (Graphics Processing Unit) 14, and main memory 16. The CPU 12 processes a signal or controls an internal constitution component based on programs such as an operating system or an application. The GPU 14 performs image processing.

These components are mutually connected to one another via a bus 20. An input and output interface 18 is further connected to the bus 20. A communication unit 22 such as a peripheral interface (e.g. USB or IEEE 1394), or a wired or wireless LAN network interface, a memory unit 24 such as a hard disk drive or non-volatile memory, an output unit 26 that outputs data to an output apparatus such as a display apparatus or a speaker, an input unit 28 that inputs data from an input apparatus such as a keyboard, a mouse, a microphone, and a camera, and a recording medium driving unit 30 that drives a removable recording medium such as a magnetic disk, an optical disk, or semiconductor memory are connected to the input and output interface 18.

The CPU 12 controls the whole information processing apparatus 10 by executing an operating system stored in the memory unit 24. The CPU 12 also executes various programs that are read from the removable recording medium and loaded into the main memory 16 or that are downloaded via the communication unit 22.

The GPU 14 has a function of a geometry transfer engine and a function of a rendering processor, performs a rendering process in accordance with a rendering command from the CPU 12, and stores a display image in a frame buffer (not shown). The GPU 14 then converts the display image stored in the frame buffer into a video signal and outputs the video signal to the output unit 26 or the like.

Figure 3:
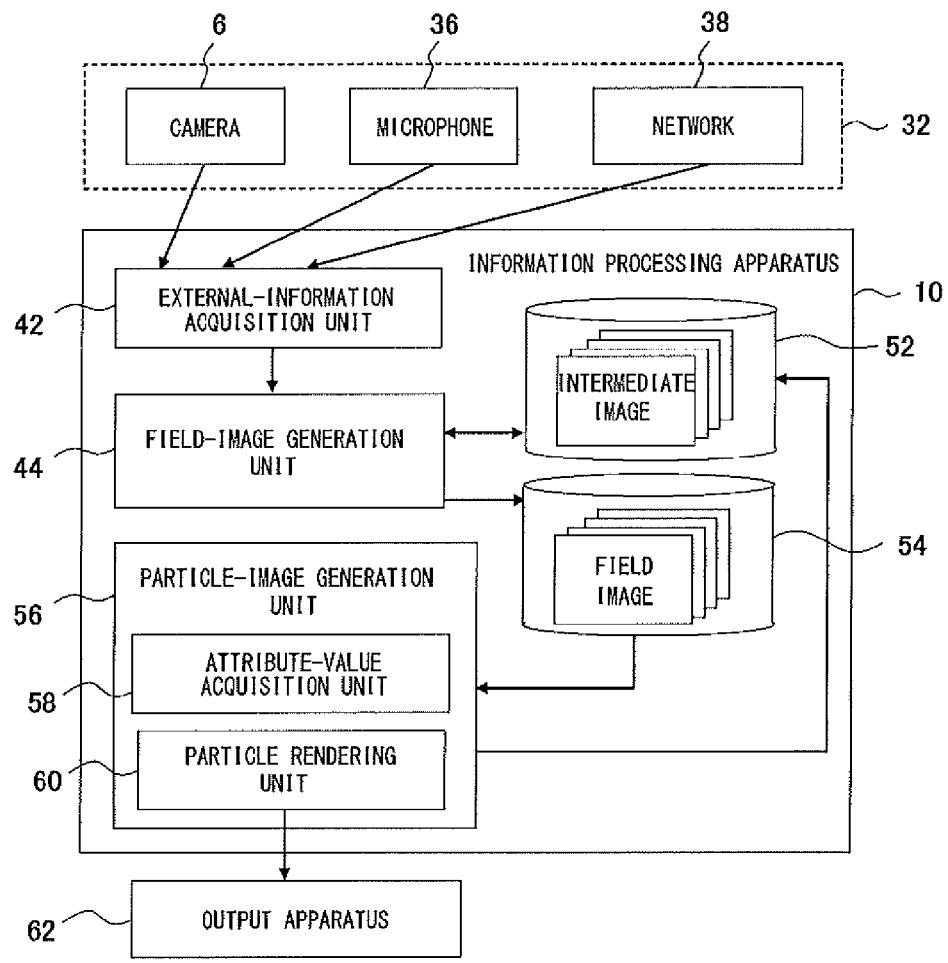
FIG. 3 is a diagram showing a relationship, with an input apparatus and with an output apparatus, of a functional block diagram of the information processing apparatus in the embodiment.

FIG. 3 shows a relationship of a functional block diagram of the information processing apparatus 10 with an input apparatus and with an output apparatus. In FIG. 3, the components described as functional blocks which perform various processes are provided by hardware such as CPU, GPU, memory, and other LSI, or by software such as image processing programs and the like. Therefore, it will be obvious to those skilled in the art that the functional blocks may be implemented in a variety of manners by a combination of hardware and software.

In the present embodiment, the external information that determines the behavior of the particles includes an image, a sound, textual information, numerical information, etc., as described above. The input apparatus 32 that inputs necessary data to the information processing apparatus 10 includes a microphone 36 and a network 38 as well as a camera 6. These input apparatuses 32 are connected to the communication unit 22 or the input unit 28 of the information processing apparatus 10. The camera 6, the microphone 36, or the like may be mounted in a game device, a mobile phone, etc. In this case, an input to the information processing apparatus 10 is provided via a data output mechanism of the respective devices.

An output apparatus 62 is typically a display apparatus that displays a generated image on the spot. However, the output apparatus 62 may be a hard disk drive or a recording medium that stores a moving image file to be reproduced later. Therefore, these output apparatuses 62 may be connected to the output unit 26. Alternatively, the output apparatuses 62 may be a combination of the recording medium driving unit 30 and a recording medium or may be the memory unit 24.

The information processing apparatus 10 includes an external-information acquisition unit 42, a field-image generation unit 44, an intermediate-image memory unit 52, a field-image memory unit 54, and a particle-image generation unit 56. The external-information acquisition unit 42 is realized by the cooperation of the CPU 12 and the communication unit 22 or the input unit 28 and acquires, from the input apparatus 32, one or more types of external information in accordance with an application setting or a user's selection.

For example, the external-information acquisition unit 42 sequentially acquires the data of an image being captured from the camera 6 and sequentially acquires an audio signal on the spot from the microphone 36. The external-information acquisition unit 42 acquires various types of information such as weather information provided from a server connected via the network 38 in an RSS (RDF Site Summary) format from the network 38. In addition, the external-information acquisition unit 42 may acquire from a television broadcast wave or a radio broadcast wave received through an antenna (not shown) or may read, from a recording medium, moving image data, music audio data, etc.

The field-image generation unit 44 is realized by the CPU 12 and generates, as an image, a "field" that acts on a particle for each predetermined time step based on the external information. More specifically, a field image is generated by making images corresponding to different kinds of external information such as an image, a sound, textual information, numerical information, etc., and then by combining and processing the images. The "field" represents the distribution of attribute value of the particles in a two-dimensional space in which the particles exist. For example, an image of an "acceleration field" and a "velocity field" having the two-dimensional space distribution of acceleration and velocity as its pixel value is generated. A specific example will follow.

Due to such fields acting on a number of particles that exist in the same two-dimensional space on a time step-by-time step basis, the particles are affected by those fields and move or change the shape thereof as a result. When the external information changes over time, the fields also change accordingly. As a result, the behavior of the particles can be changed in accordance with the time change of the external information. Hereinafter, an image that represents such a field is referred to as a "field image."

A plurality of processors of a minimum unit for synthesizing and processing an image are provided in the field-image generation unit 44. Appropriate change, by application setting, a user's selection, or the like, of the combination or the order of the processors to be used allows for various expressions with use of particles. In other words, in the field-image generation unit 44, a network where processors of a minimum unit function can be regarded as nodes is built. Image data progresses in the network, as an output image of a given node becomes an input image of another node, so as to generate a final field image. Hereinafter, an image that is temporarily generated between nodes is referred to as an "intermediate image."

The intermediate-image memory unit 52 is realized by the main memory 16 and stores an intermediate image that is generated in the process of generating a field image by the field-image generation unit 44. The intermediate-image memory unit 52 may further stores, as an intermediate image, a particle image that is finally generated for use in a subsequent process. The field-image memory unit 54 is realized by the main memory 16 and stores the field image generated by the field-image generation unit 44.

The particle-image generation unit 56 is realized by the GPU 14 and generates data of a particle image to be output finally by using the field image stored in the field-image memory unit 54. The particle-image generation unit 56 includes: an attribute-value acquisition unit 58 that acquires from each field image the attribute value of each particle in each time step based on the position in a two-dimensional space; and a particle rendering unit 60 that determines the position, color, size, etc., of the particle in the subsequent time step in accordance with the attribute value of each particle and rendering.

In the present embodiment, a field image is read out as texture data by realizing the particle-image generation unit 56 by the GPU 14. A process of acquiring a necessary value from each field image for every pixel or pixel block so that the value has an effect on a particle is performed in parallel. This allows even a general information processing apparatus to acquire an attribute value from a field image and render a particle at high speed. The processing time depends less on the number of particles compared with a case where an equation is solved for each particle, and an approximate processing time can be estimated according to the size of a particle image to be generated finally.

Figure 4:
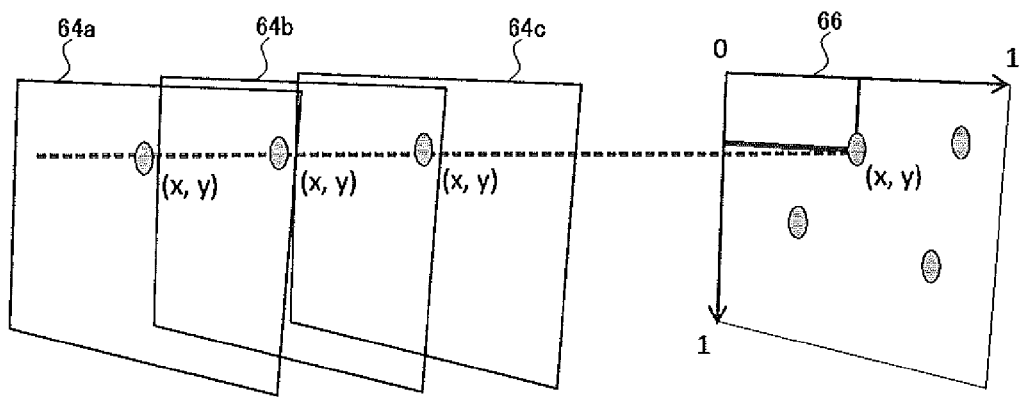
FIG. 4 is a diagram schematically showing a relationship between a field image and a particle image in the embodiment.

FIG. 4 schematically shows a relationship between a field image and a particle image. In a given time step t−1, a particle image 66 is generated. On the other hand, field images 64a, 64b, and 64c are generated for the subsequent time step t. The field images 64a, 64b, and 64c correspond to attributes given to the particle by an application or a user's selection. The field may be a friction field, a color field, a size field, etc., as well as the above-described acceleration field and velocity field.

As shown in the figure, the attribute value of a particle that exists in a screen coordinate system (x, y) is acquired by reading out the pixel value at the same position in each of the field images 64a, 64b, and 64c. As described above, when the field images 64a, 64b, and 64c are treated as texture, the process can be performed at higher speed by a texture lookup function of the GPU.

In other words, positional coordinates in a field image and a particle image are represented in a UV coordinate system that is normalized in the longitudinal direction and in the transverse direction. This allows positional correspondence to be easily made by mapping each field image in the screen coordinate system regardless of the resolution of a display or the size of the field image. Specific examples of kinds of field and a data configuration to be prepared as a field image are shown hereinafter.

TABLE 1

| FIELD | CHANNEL | SAVED VALUE |
| --- | --- | --- |
| ACCELERATION | RGB(24bit) | ACCELERATION VECTOR COMPONENTS (X, Y, Z) |
| VELOCITY | RGB(24bit) | VELOCITY VECTOR COMPONENTS (X, Y, Z) |
| FRICTION | Depth(8bit) | REDUCTION RATE OF ACCELERATION AND VELOCITY (f) |
| COLOR | RGBA(32bit) | COLOR VALUES OF A PARTICLE (R, G, B, A) |
| SIZE | Depth(8bit) | PARTICLE SIZE (Size) |

As described above, field images are prepared of an acceleration field, a velocity field, a friction field, a color field, a size field, etc. The acceleration field is expressed by three variables, which are the components (X, Y, Z) of an acceleration vector. Thus, an image thereof has a pixel value using three channels (RGB) with 24 bits. The same applies to the velocity field. In this example, the friction field is expressed by one variable f, where f is equal to or more than zero and is equal to or less than one, that expresses a rate of reduction in acceleration and velocity. Therefore, an image thereof has a pixel value using one channels (Depth) with 8 bits.

The color field may be the same as general pixel color information, and an image thereof has a pixel value using four channels (RGBA) with 32 bits. The size field is expressed by one variable, which is Size that expresses the size of a particle. Thus, an image thereof has a pixel value using one channel (Depth) with 8 bits. Since a particle image to be finally generated is two-dimensional plane, the acceleration and the velocity in the depth direction (z direction), when acquiring the movement of a particle, do not need to be taken into consideration. However, the acceleration and the velocity in such direction are saved as channels for a pixel value in case some process is performed using the values thereof. Alternatively, the displacement in the depth direction may be incorporated in the size of the particle.

An intermediate image may has various pixel values according to the original external information or the content of, for example, a combining or processing process. One predetermined channel may be selected to process an intermediate image having a pixel value of three channels. The number of channels may be controlled by using a conversion equation for the conversion of an RGB image to gray scale, or the like.

When a field image such as the one described above is used, a positional coordinate $x_t$ at a time step t of a particle, which exists at a positional coordinate $x_{t-1}$ at a previous time step t−1, can be obtained, for example, as shown in the following, where the time interval is represented as dt.

$$x_t = (\tfrac{1}{2}\alpha dt^2 + vdt)f + x_{t-1}$$

In this expression, α represents an acceleration vector acquired from the acceleration field and v represents a velocity vector acquired from the velocity field. The behavior of particles according to a field can be expressed as an image by performing a calculation such as the one described above at each time step for particles to which an initial distribution is assigned. As described above, the field image itself changes according to the external information.

Figure 5:
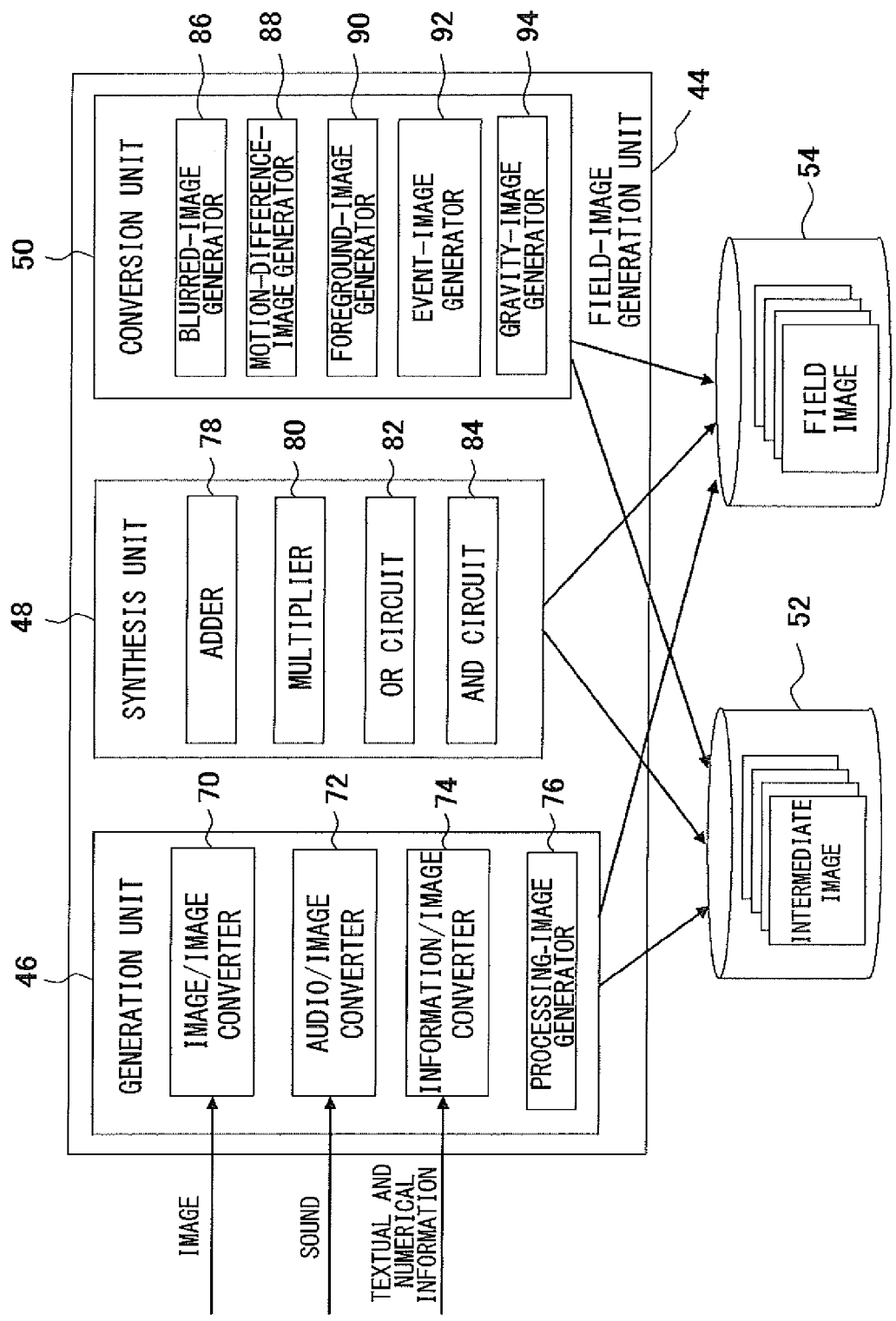
FIG. 5 is a diagram showing the detailed configuration of a field-image generation unit in the embodiment.

FIG. 5 shows the detailed configuration of the field-image generation unit 44. The field-image generation unit 44 includes: a generation unit 46 that generates a first intermediate image based on external information; a synthesis unit 48 that combines the intermediate images; and a conversion unit 50 that generates an image obtained by processing the intermediate image or by extracting necessary information from the intermediate image. The generation unit 46 generates a first intermediate image based on external information and stores the intermediate image in the intermediate-image memory unit 52. Alternatively, the generation unit 46 stores the generated image in the field-image memory unit 54 when the generated image is used as a field image.

The synthesis unit 48 and the conversion unit 50 read out the intermediate image from the intermediate-image memory unit 52 and store generated image as a new intermediate image in the intermediate-image memory unit 52 after processing. Alternatively, the synthesis unit 48 and the conversion unit 50 store the generated image in the field-image memory unit 54 when the generated image is used as a field image. As described above, an image generated by the generation unit 46, the synthesis unit 48, or the conversion unit 50 can be an intermediate image or a field image depends on a combination or a order of processes that are set. Regarding FIG. 5, an explanation is hereinafter given on the premise that the generated image is an intermediate image.

The generation unit 46 includes an image/image converter 70, an audio/image converter 72, an information/image converter 74, and a processing-image generator 76. The image/image converter 70 performs a process of converting an image acquired from the input apparatus 32 to an image where the attributes of the image (e.g., size, gradation, frame rate, etc.) are adjusted to be preferred values as an intermediate image. The audio/image converter 72 makes an image of an audio signal acquired through a microphone according to a predetermined rule. The information/image converter 74 makes an image of textual or numerical information acquired through a network according to a predetermined rule. The processing-image generator 76 generates an image to be combined so as to process an intermediate image. A detailed description will be made hereinafter regarding a specific example of making an image of a sound, textual information, or numerical information and regarding the process into an intermediate image.

The synthesis unit 48 combines a plurality of intermediate images so as to generate a single intermediate image. More specifically, the synthesis unit 48 includes: an adder 78 that adds up respective pixel values of a plurality of images on a pixel-by-pixel basis; a multiplier 80 that performs multiplication on a pixel-by-pixel basis; an OR circuit 82 that performs logical addition on a pixel-by-pixel basis; and an AND circuit 84 that performs logical multiplication on a pixel-by-pixel basis. In other words, the adder 78, the multiplier 80, the OR circuit 82, and the AND circuit 84 perform the following operations, respectively.

$$\text{ADDITION: } NewImage(x, y) = \sum_{i=1}^{N} Image_i(x, y)$$

$$\text{MULTIPLICATION: } NewImage(x, y) = \prod_{i=1}^{N} Image_i(x, y)$$

$$\text{LOGICAL ADDITION: } NewImage(x, y) = \bigcup_{i=1}^{N} Image_i(x, y)$$

$$\text{LOGICAL MULTIPLICATION: } NewImage(x, y) = \bigcap_{i=1}^{N} Image_i(x, y)$$

In the above expression, all intermediate images to be combined are combined in the same weighting. However, weights may be assigned, for example, to emphasize a predetermined intermediate image depending on the expressive intention. The synthesis unit 48 may be used as a switch for intermediate images, which, for example, selects and outputs one intermediate image from among a plurality of input intermediate images by allowing a weighting coefficient to be zero. In this way, an image can be switched that is used for the generation of an field image, for example, at the time of event occurrence, which is described hereinafter.

The conversion unit 50 generates a new image by processing one or a plurality of intermediate images or by extracting only necessary information. More specifically, the conversion unit 50 includes a blurred-image generator 86, a motion-difference-image generator 88, a foreground-image generator 90, an event-image generator 92, and a gravity-image generator 94.

The blurred-image generator 86 generates an image obtained by blurring an input intermediate image. An existing technology such as a Gaussian blur may be employed in the blurring process. The motion-difference-image generator 88 generates a difference image between a current intermediate image and an intermediate image that is earlier by a predetermined number of time steps and generates a motion difference image where different predetermined pixel values are respectively assigned to a pixel included in an area having motion difference and to a pixel included in the rest of the area.

As described hereinafter, the motion difference image can be used to slow down the movement of a particle only in the area having motion difference or to determine whether something moves or not by setting a threshold value for an averaged pixel value. The foreground-image generator 90 extracts, based on a difference between an input intermediate image and a background image stored therein, the foreground of the intermediate image and generates a foreground image in which different pixel values are assigned to the foreground and the background. A conventional art can be used in the extraction of the foreground.

The event-image generator 92 determines whether or not a predetermined event has occurred by analyzing the input intermediate image and expresses the presence or absence of the occurrence of the event by an image. For example, an image where all the pixel values are "0" is prepared for each kind of event, and all the pixel values are updated to be "1" when the event occurs. An image to be prepared contains only one pixel and may be stretched to a desired image size in a subsequent process. Alternatively, an image associated with the occurring event may be read out from the main memory 16 and then output as an intermediate image.

The gravity-image generator 94 generates a height image in which the pixel value of an input intermediate image is regarded as height information and generates an image of a velocity field or an acceleration field according to the height on the premise of gravity. In the height image, the size of the pixel value of an input image is assumed to be the depth, and the larger the pixel value becomes, the lower the image becomes, in an example described hereinafter. In a portion where the pixel value changes, it is determined that there is a difference in height and gravitational acceleration is accordingly generated. In a portion where the pixel value changes drastically, it is determined that the gradient in height is large, and the velocity is accordingly increased. The pixel value in the field image of a velocity field or an acceleration field that is actually generated does not need to be the actual physical quantity as long as such a qualitative feature is quantified under a predetermined rule.

Figure 6:
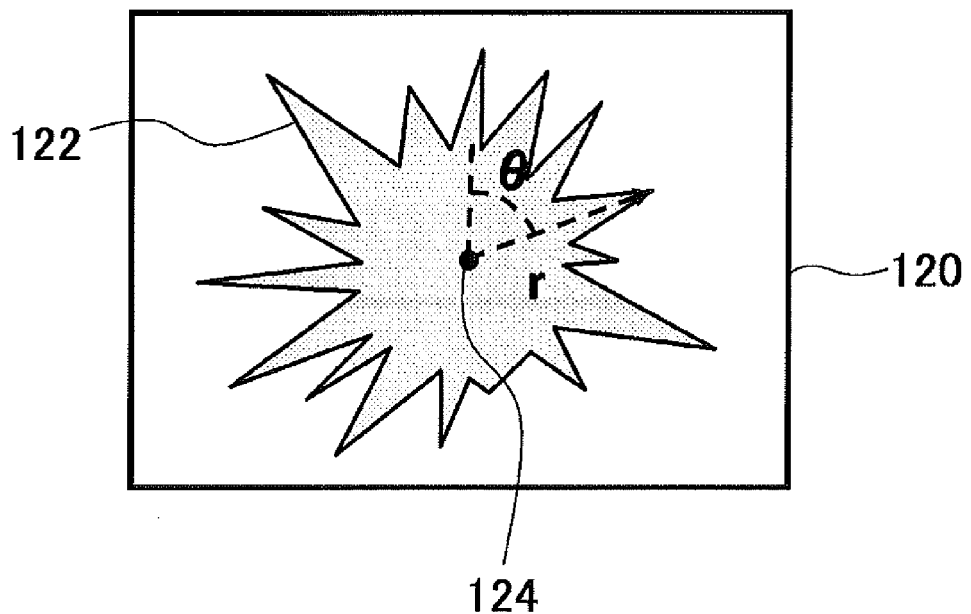
FIG. 6 is a diagram showing an example of an image generated by converting an audio signal acquired through a microphone by an audio/image converting unit in the embodiment.

FIG. 6 shows an example of an image generated by converting an audio signal acquired through a microphone by the audio/image converter 72. An audio conversion image 120 includes an audio characteristic figure 122. The audio characteristic figure 122 is a figure in which coordinates representing respective sampling results are connected with a straight line in polar coordinate where the center of the image is represented by an origin 124 and where a sampling time and an audio level are expressed as an angle $\theta$ and a radius r, respectively, when a predetermined cycle is specified to be $2\pi$. When the cycle of the angle is designated to correspond to a frame display cycle, for example, 16 msec, the audio characteristic figure 122 is updated for every frame display cycle. The audio/image converter 72 generates an image to which a predetermined pixel value is assigned, for example, where a pixel value of "1" is assigned to the pixel included in an area inside the audio characteristic figure 122 and where a pixel value of "0" is assigned to a pixel included in an area outside thereof.

Figure 7:
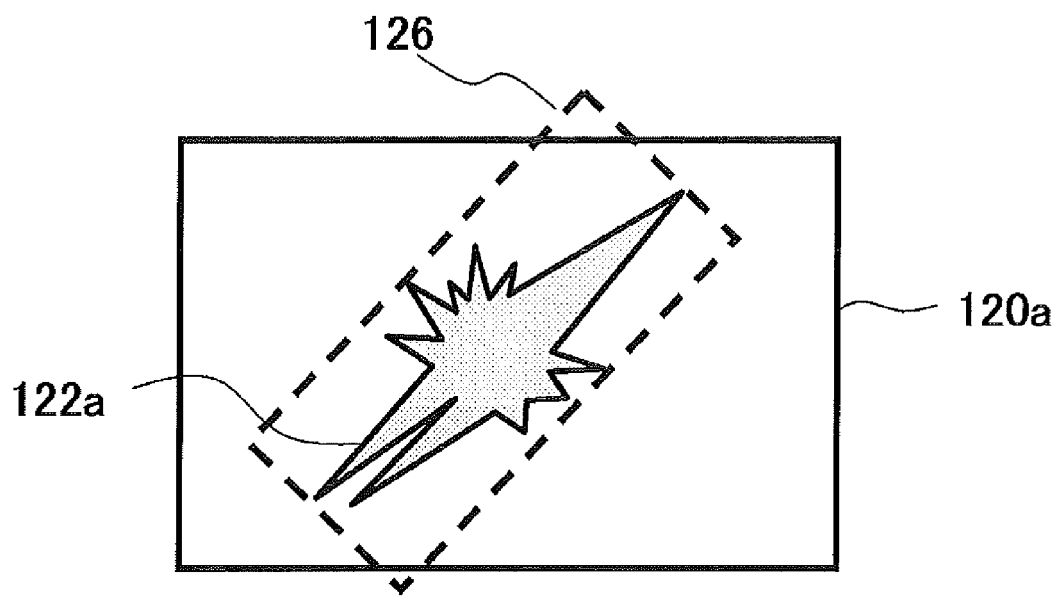
FIG. 7 is a diagram explaining a technique of an event-image generator detecting the occurrence of an event by analyzing an audio conversion image in the embodiment.

Whether or not a specific event has occurred in a sound can be determined by using the audio conversion image 120. FIG. 7 is a diagram explaining a technique of an event-image generator 92 detecting the occurrence of an event by analyzing an audio conversion image. A detailed description will be made regarding an example of detecting, as an event, the generation of a loud sound in a short amount of time such as a sound during hand clapping, when an object bursts, or the like. Hereinafter, such a sound is referred to as a "plosive sound." As explained in reference to FIG. 6, an audio characteristic figure 122a is shown in an audio conversion image 120a.

When a plosive sound is generated, the amplitude of a sound level increases drastically only for a short amount of time in an audio signal. When this is applied to the audio characteristic figure 122a, a figure is obtained where the radius r changes drastically in the positive and negative directions within a small angle as shown in FIG. 7. In other words, the shape of the figure becomes long and thin in whole, compared to when there is no plosive sound. The event-image generator 92 obtains a rectangle 126 circumscribed around the audio characteristic figure 122a and detects the generation of a plosive sound based on the size and the ratio of the lengths of the horizontal and vertical sides of the rectangle.

For example, threshold values are set for the length of the side in the transverse direction of the rectangle 126 and for the ratio of the length of the side in the longitudinal direction to the side in the transverse direction, and a plosive sound is determined to be generated when the both exceed the respective threshold values. When a plosive sound is detected in this manner, the event-image generator 92 generates an image that indicates the generation of an event by, for example, updating the pixel value of an image for plosive sound occurrence from "0" to "1", as described above, or reads out and outputs an image that is generated in advance. In the case of an event for which the audio characteristic figure 122 indicates a characteristic change, a sound other than a plosive sound can be also detected by using a similar method.

Figure 8:
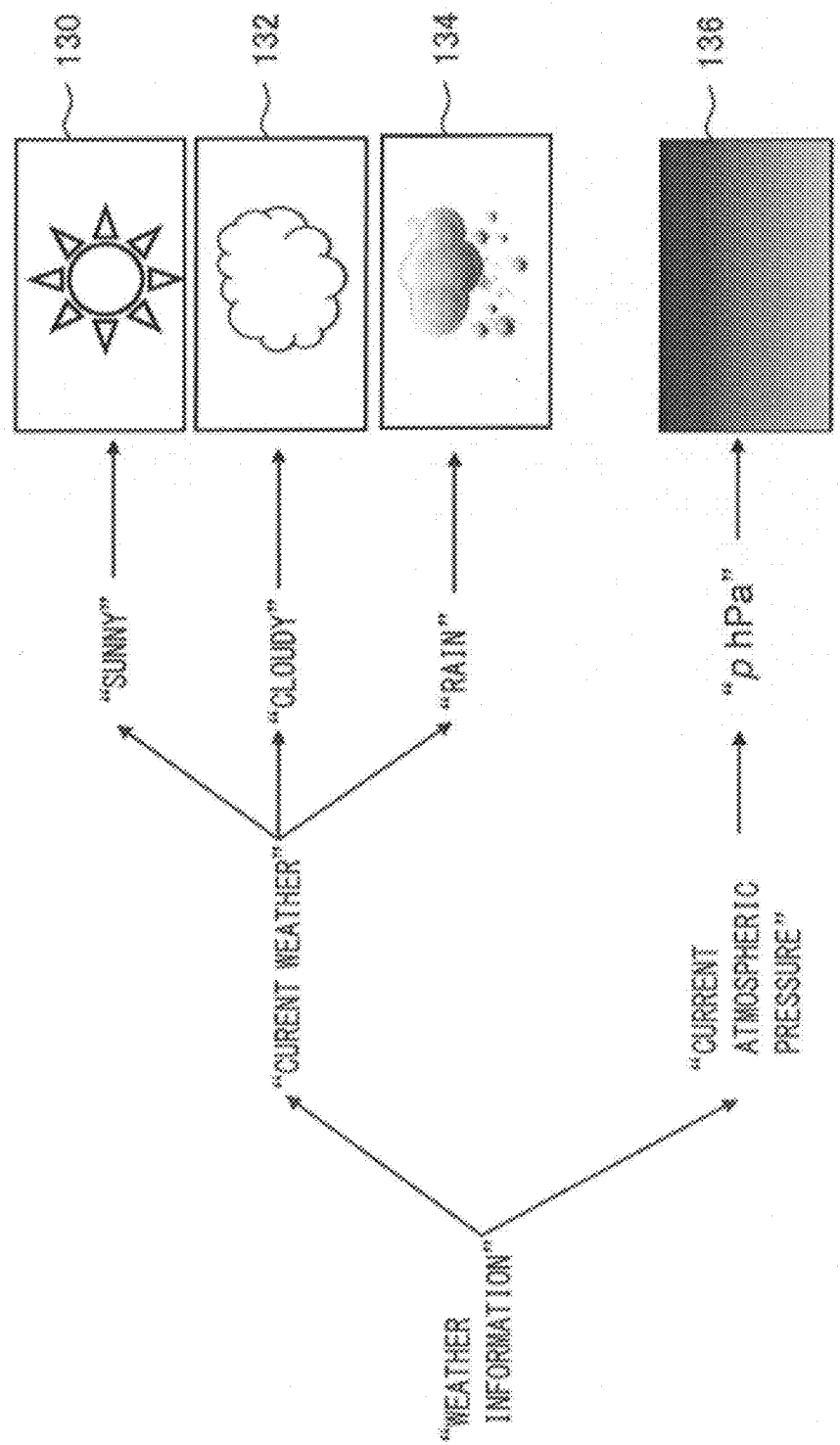
FIG. 8 is a diagram showing an example of an image generated by converting weather information in the embodiment.

An explanation is now given of an example where the information/image converter 74 converts text-based information such as textual information and numerical information into an image. FIG. 8 shows an example of an image generated by converting weather information. In this example, information regarding the "current weather" and the "current atmospheric pressure" across the country is acquired as needed as "weather information." An image that represents a word indicating weather is output for the "current weather." For example, an image 130 that represents sunny weather, an image 132 that represents cloudy weather, or an image 134 that represents rain is output when the word is "sunny," "cloudy," or "rain," respectively.

Therefore, a table associating a word such as "sunny" or "rain" that indicates weather with the data of a representing image that represents the weather is prepared, and the information/image converter 74 reads out, from the main memory 16 or the like, image data that corresponds to acquired information and outputs the image data as an intermediate image. As shown in FIG. 8, the "representing image" may be an image filled with representing color as well as a picture and a photo. The intermediate image thus output can be used when displaying an image where a particle itself has a shape or color that represents weather or where particles gather in the shape of a figure that represents weather.

On the other hand, for the numerical information indicating the "current atmospheric pressure," the information/image converter 74 generates an image where the gradient of the shading is changed according to a value p of the atmospheric pressure, in a gradation image 136 where the gradient of the shading changes gradually from the top to the bottom of the screen. For example, a gradation image is generated where the pixel value at the bottom of the image is fixed to be 255 and where the pixel value at the top becomes smaller as the value p of the atmospheric pressure becomes larger. The gradient in the pixel value may be expressed by a line or a curve. Depending on the usage of the gradation image in a subsequent stage, the image may be a grayscale image or an RGB image.

Figure 9:
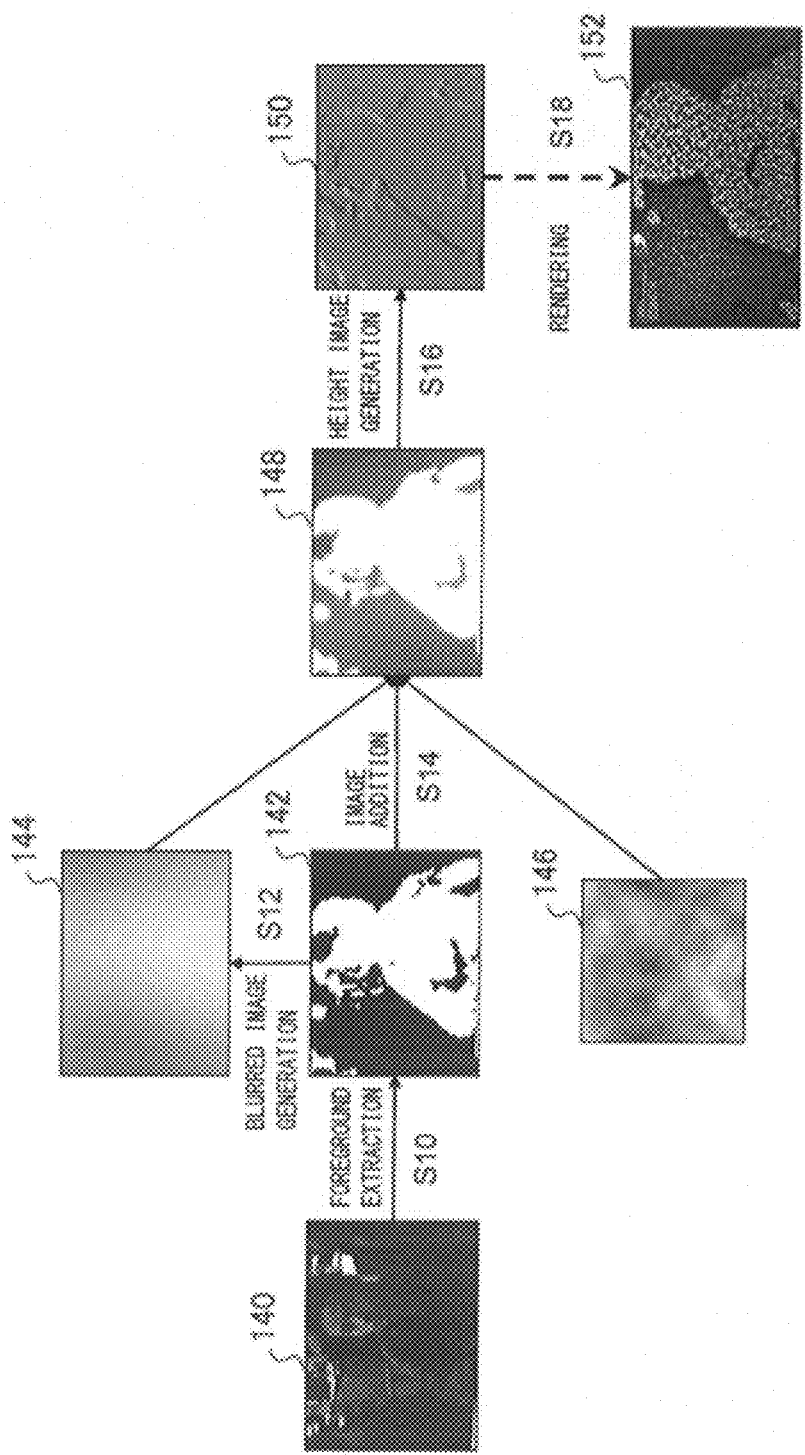
FIG. 9 is a diagram showing an example of a processing sequence of generating a field image of an acceleration field from an image being captured by a camera in the embodiment.

An explanation is now given of an example of a processing sequence performed in the above-described configuration of the field-image generation unit 44 by using an example where a field image of an acceleration field is generated. FIG. 9 shows an example of a processing sequence of generating a field image of an acceleration field from an image being captured by a camera. The processing sequence shown in FIG. 9 and the flowchart shown in FIG. 11, which is described hereinafter, display the processing sequence of each component by a combination of a letter "S" (the initial of the word "Step"), which represents a step, and a number.

The image 140 corresponds to an frame image captured by a camera. The size and the like are appropriately adjusted by the image/image converter 70 at this time. The foreground-image generator 90 performs a foreground extraction process on the image 140 and generates a foreground image 142 that is expressed in two tones (S10). In the example shown in FIG. 9, the foreground image 142 is generated from the captured image 140 of a person in a room. In the foreground image 142, a foreground area of the person extracted from the captured image is turned white and a background area is turned black.

The blurred-image generator 86 generates a blurred image 144 obtained by blurring the foreground image 142 (S12). The adder 78 then generates an added image 148 obtained by adding up the foreground image 142, the blurred image 144, and a turbulence noise image 146 generated by the processing-image generator 76 (S14). A color-tone gradient is provided at the edge of the foreground in the foreground image 142 by adding the blurred image 144. Randomness is added to the entire image by adding the turbulence noise image 146 so as to allow the final movement of a particle to look natural.

The gravity-image generator 94 then generates a height image 150 where the amount of the pixel value of the added image 148 is assumed to be the depth (S16). A field image of the acceleration field is then generated from the height image 150, as described above. When the particle-image generation unit 56 renders particles by using the image of the acceleration field thus generated (S18), the particles falls on a lower part of the height image 150, and an image 152 can be eventually generated where the particles gather together to form the shape of the person over time.

In the process S1 of generating the height image 150 from the added image 148, the synthesis unit 48 may combine another intermediate image and perform some processing. For example, an image is generated where the overall whiteness increases from the top to the bottom of the screen in the added image 148 by combining a gradation image according to the value p of the atmospheric pressure, which is generated by the information/image converter 74. As a result, the height goes down toward the bottom of the screen in the height image 150, and a force toward the bottom of the screen is generated for a particle. This allows for an effect to be realized where a particle settles toward the bottom of the screen when the atmospheric pressure increases.

When an event such as a plosive sound is generated, the synthesis unit 48 may combine an image generated in accordance with the generation of the event or an image prepared in association with the event only for the period of time. Generating a filled image where the pixel value is updated in accordance with the generation of the event, as described above, allows for the period when the event is generated to be identified.

For example, the event-image generator 92 generates a gradation image in which the pixel value decreases outward from the foreground in a radial manner and combines the gradation image with the added image 148. Adjusting the weighting at the time of the combination so as to increase the effect of the gradation image allows for an effect to be realized where the particles gathered to form the shape of the person burst to scatter outward in the screen. Making a combination similarly in a process of generating a field image of a velocity field allows the effect of the generation of a plosive sound to be more rapidly incorporated in the behavior of the particles.

Figure 10:
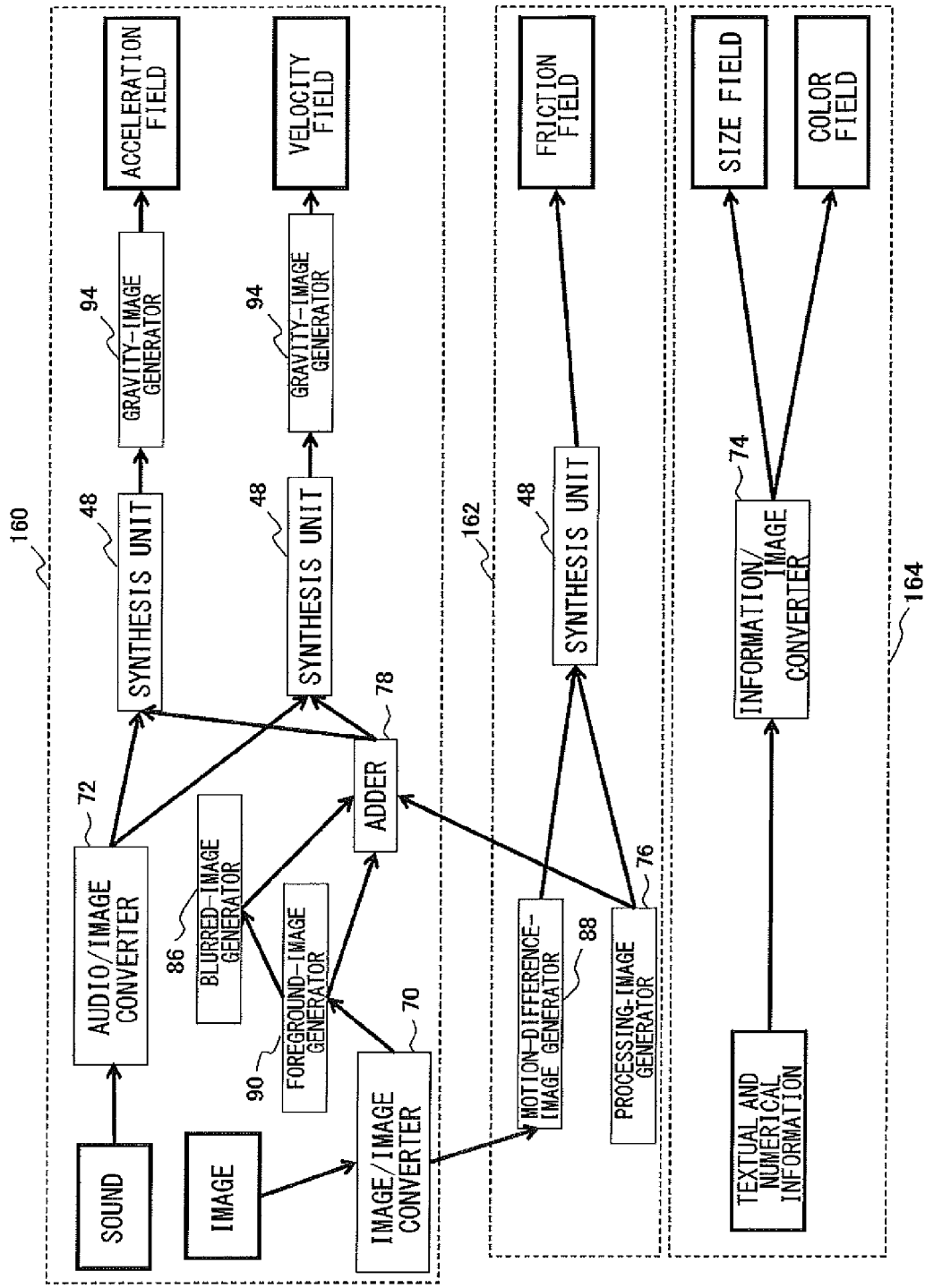
FIG. 10 is a diagram showing an example of a processing network formed by functional blocks of the field image generation unit of the embodiment.

FIG. 10 shows an example of a processing network formed by functional blocks of the field image generation unit 44. The processes shown in FIG. 9 are mainly shown in a dashed-line rectangle 160. In addition to this, an image is generated as the field image of a friction field in the example shown in FIG. 10; the image is obtained by combining an image generated by the motion-difference-image generator 88 where a predetermined pixel value is assigned only to an motion area with a turbulence noise image generated by the processing-image generator 76 (dashed line 162). This allows for an effect to be realized where the velocity and the acceleration in the motion area are reduced and where a particle follows behind a person, etc.

On the other hand, field images of a size field and a color field are generated based on textual information and numerical information (dashed line 164). For example, a filled image having a pixel value that is inversely proportional to the value of the atmospheric pressure is generated and used as the field image of the size field. This allows a particle to be expressed just like a balloon that expands as the atmospheric pressure decreases. An image filled with a color corresponding to weather is generated and used as the field image of the color field. This allows a particle to be expressed that changes the color thereof according to weather, for example, into yellow for "sunny" and blue for "rain."

In addition to this, as an example of converting weather information into an image, the velocity in the velocity field may be increased by increasing the pixel value as the velocity of wind increases. Moreover, a field image of a viscosity coefficient may be generated where the viscosity of the particle is increased by increasing the pixel value as the humidity increases. Weather information is given above as an example of textual information and numerical information. However, an example is not limited to weather information, and any information can be incorporated in the expression with use of a particle in a similar manner by associating an information type with an image to be generated.

The processing network shown in FIG. 10 is a part of embodiments that can be realized in the present embodiment, and changing the connection of the processes performed by the functional blocks shown in FIG. 5 in a various ways allows various processes to be easily achieved in accordance with, for example, the purpose of use or the expressive intention of a particle image. Further, a particle image generated by the particle-image generation unit 56 may be input in the processing network as an intermediate image.

For example, a field image of a velocity field or an acceleration field can be generated, where a repulsive force is generated between particles, by generating and combining an image where the pixel value decreases at the position of a particle in a particle image earlier by one time step. This prevents the generation of a phenomenon where particles accidentally clump together in an unintended area and allows the particles to appear to be naturally gathering toward an intended area.

Figure 11:
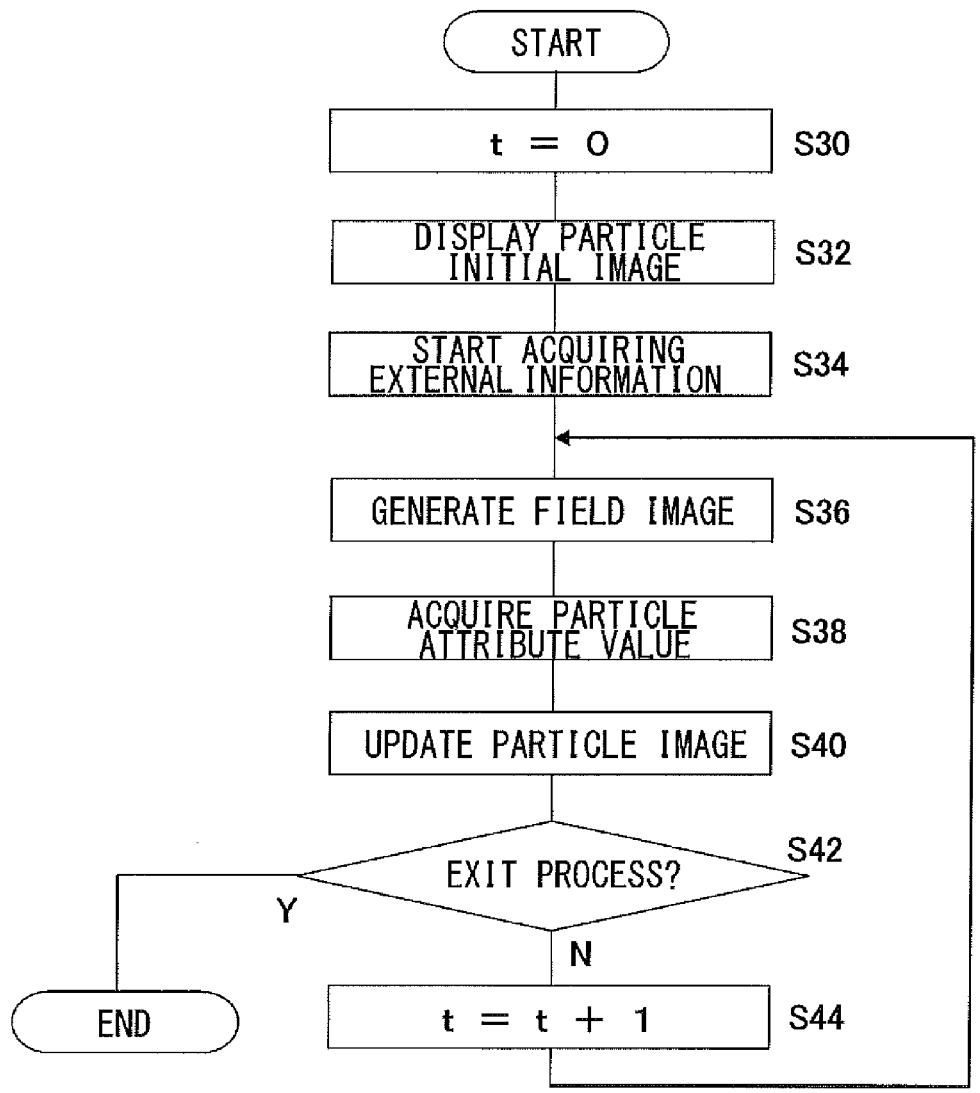
FIG. 11 is a flowchart showing a processing sequence of the information processing apparatus of the embodiment generating a particle image based on external information.
Figure 12:
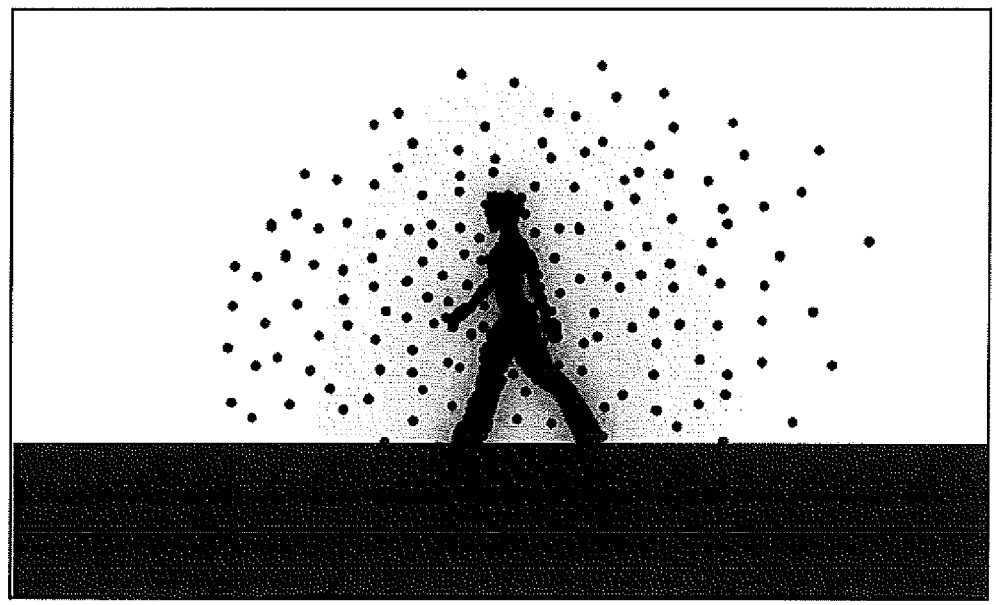
FIG. 12 is a diagram showing an example of an image finally output to the output apparatus in the embodiment.

A detailed description will now be made of the operation of the information processing apparatus 10 that can be realized by the configurations described thus far. FIG. 11 is a flowchart showing a processing sequence of the information processing apparatus 10 generating a particle image based on external information. The flowchart shown in FIG. 11 begins when a user enters into the information processing apparatus 10 an instruction that indicates to start outputting a particle image. When zero is assigned to a variable t that represents a time step (S30), an initial image is displayed where a particle is assigned a predetermined initial distribution (S32). The external-information acquisition unit 42 then starts acquiring external information from the camera 6, the microphone 36, the network 38, etc., (S34).

The field-image generation unit 44 then sequentially performs a process in accordance with an application and setting by a user and generates a predetermined field image (S36). The attribute-value acquisition unit 58 of the particle-image generation unit 56 accesses each field image by a texture lookup function and acquires the value of each field at the position of a particle as the attribute value of the particle (S38). The particle rendering unit 60 updates the particle image by moving a particle assigned an initial distribution or changing the color or the size in accordance with the attribute value of the particle (S40).

When no instruction indicating the termination of the process is provided by a user (N in S42), the processes S36 through S40 are repeated while incrementing a time step (S44). Meanwhile, the acquisition of external information started in S34 continues. A frame display cycle that can be determined by the display apparatus 8 or the like is designated as an interval between time steps. The process is ended when an instruction indicating the termination of the process is entered by the user (Y in S42).

FIG. 12 through FIG. 15 show examples of an image that is finally output to the output apparatus 62. In a particle image 170 shown in FIG. 12, particles gather together to form the shape of a person whose image is being captured. As described above, this is achieved by determining the velocity field and the acceleration field based on the height image where the area of a person that is extracted in the foreground extraction process is lower than the other area and by rendering particles moved for a time interval in accordance with the velocity field and the acceleration field.

Figure 13:
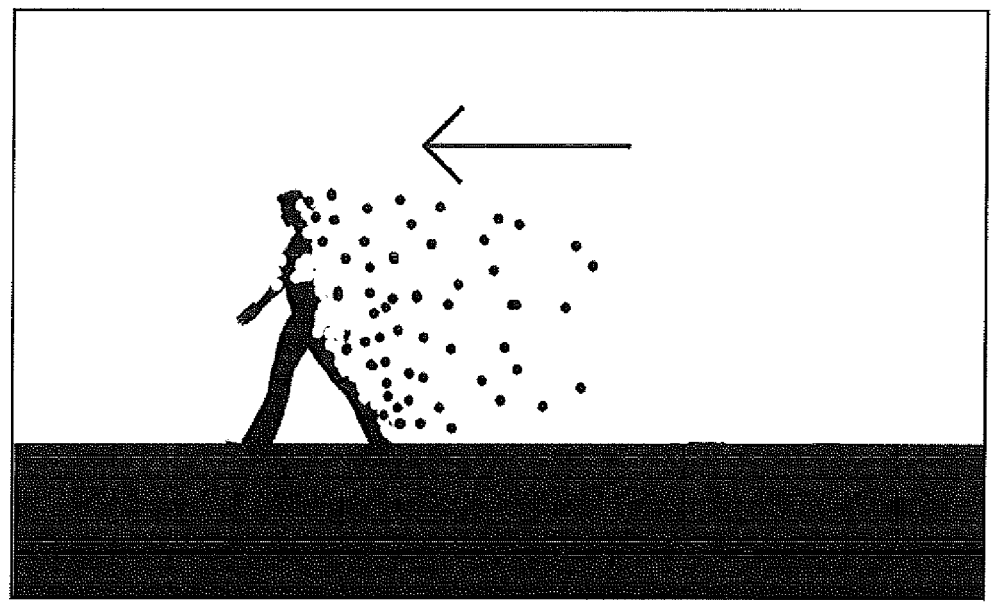
FIG. 13 is a diagram showing an example of an image finally output to the output apparatus in the embodiment.

FIG. 13 shows a particle image 172 where particles follow a person, whose image is being captured, walking toward the left in the screen in accordance with the movement of the person. As described above, generating a friction field that decreases velocity and acceleration in an area behind the person where motion is detected based on a difference from a previous frame allows for an effect to be realized where a particle appears to "lag behind."

Figure 14:
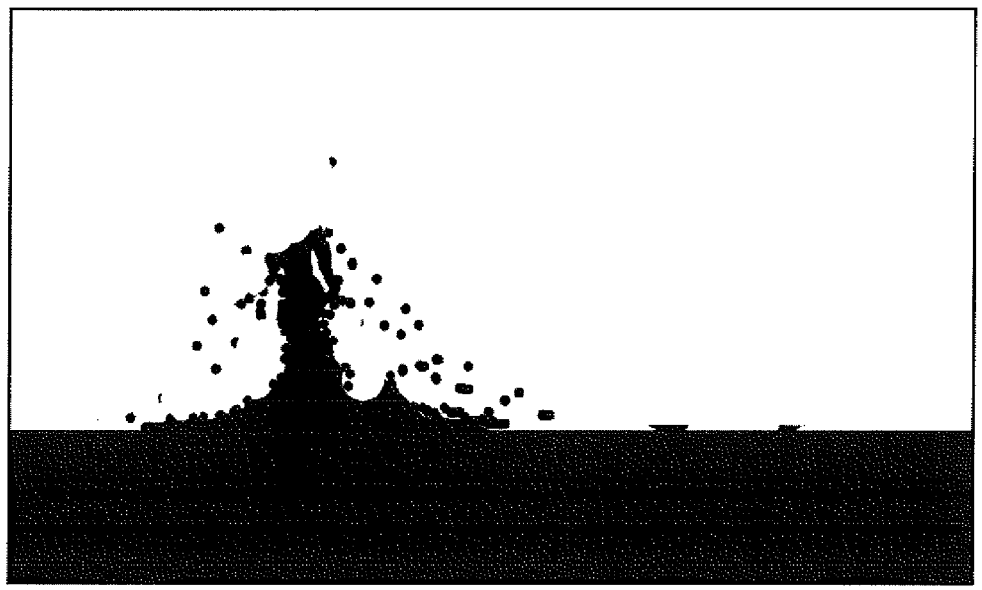
FIG. 14 is a diagram showing an example of an image finally output to the output apparatus in the embodiment.

FIG. 14 shows a particle image 174 where aggregation of particles gradually breaks down after a predetermined amount of time after the person, whose image is being captured, comes to rest. In this case, the processing-image generator 76 outputs a gradation image where the pixel value increases from the top to the bottom of the screen, as in the gradation image 136 shown in FIG. 8, when no motion is detected in a motion detection process for a predetermined amount of time. Then the gravity-image generator 94 uses the gradation image when generating a height image. Alternatively, such an image is combined while assigning a large weight in the process of generating an acceleration field. This allows the clumped particles to appear to fall toward the bottom of the screen.

Figure 15:
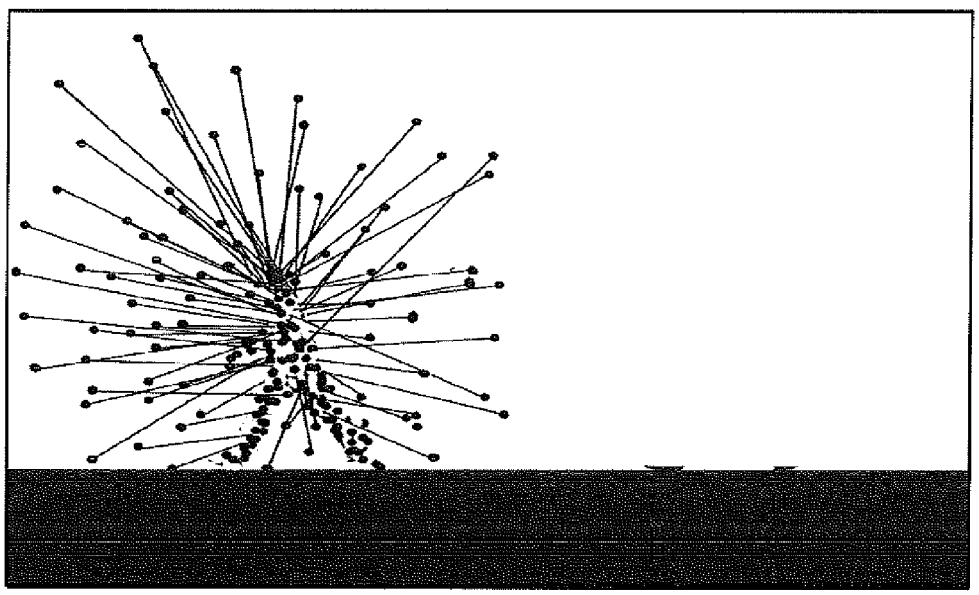
FIG. 15 is a diagram showing an example of an image that is eventually output to the output apparatus in the embodiment.

FIG. 15 shows a particle image 176 where particles burst when the generation of a plosive sound is detected from an audio signal. This can be realized by generating an image having acceleration and velocity in an outward direction from a foreground and by switching a field image to be used or by combining the image while assigning a weight in a field-image generation process, as described above, at the time a plosive sound is generated. Crowd animations can be expressed by performing similar processing while using particles to form birds, insects, fish, etc., where birds gather depending on the movement of a person or fly away in response to a sound.

According to the above-described embodiment, a final particle image is generated by treating, as an image in a unified manner, various types of information such as audio data, textual information, and numerical information as well as the data of an image captured by a camera. This allows all pieces of information to be processed similarly as intermediate images without any special processor provided according to the type of information and to be incorporated in a final result.

Information obtained from various perspectives such as image data, audio data, textual information, and numerical information is used to generate a field image that determines the behavior of a particle. A field image expresses velocity, acceleration, friction, a size, or a color with respect to a position in the same two-dimensional plane as that of a particle image. Preparing such an image allows each particle and the attribute thereof to be connected at high speed by using a texture lookup function of a GPU. Even when there are a number of particles, the processing time can be estimated based on the size of an image by performing parallel processing on a pixel-by-pixel basis or on a pixel block-by-pixel block basis in the GPU. Since such processing can be performed by using a conventional GPU, low-cost realization can be possible.

Audio data is made into an image by an audio characteristic figure obtained by connecting points when a sampled audio signal is plotted in polar coordinate where a sampling time and an audio level are expressed as an angle $\theta$ and a radius r, respectively. This allows the characteristics of a sound to be captured as the characteristics of a figure. For example, when the generation of a plosive sound is detected based on the aspect ratio of a rectangle circumscribed around the audio characteristic figure, a velocity field and an acceleration field are changed accordingly, allowing an effect to be realized where particles bust in response to the plosive sound. Most of such processing is image processing and can thus be performed by a mechanism similar to that for other image processing, as described above.

Also, information to be incorporated in the behavior of a particle is incorporated by simple processing of synthesizing an image. Thus, processing can be easily and efficiently changed; for example, weight assignment at the time of a combination is changed when an event is generated, or a test is conducted to find a result obtained by a different type of information.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

For example, a field image is generated based on information, such as an image or a sound, acquired from the outside by an information processing apparatus so that the field image has an effect on a particle in the embodiment. On the other hand, similar processing may be performed based on information recorded or monitored in the information processing apparatus. For example, an embodiment may be realized, by generating as a field image a gradation image or an image filled with a single color, the gradient or the color being determined according to CPU or memory utilization, where a particle changes in accordance with any change thereof over time. The external information and the apparatus internal information may be combined and introduced. In these cases, the same effects as those obtained in the embodiment can also be achieved.

What is claimed is:

1. An information apparatus that outputs image data where a particle is time-varied comprising:
an input information acquisition unit configured to acquire time-varying input information;
a field-image generation unit configured to generate, based on the input information, a field image in which a distribution of an attribute value for each attribute to be assigned to a particle is expressed in a two-dimensional space in which a particle exists for a predetermined timestep; and
a particle rendering unit configured to acquire the attribute value of a particle from the field image based on a positional coordinate of the particle at a given timestep and to render the particle at a subsequent time step in accordance with the attribute value.

2. The information processing apparatus according to claim 1 wherein the field-image generation unit generates one or more of the following: an image of an acceleration field whose pixel value represents a component of an acceleration vector; an image of a velocity field whose pixel value represents a component of a velocity vector; an image of a friction field whose pixel value represents a reduction rate of acceleration and velocity; an image of a color field whose pixel value represents color information of a particle; and an image of a size field that represents the size of the particle.

3. The information processing apparatus according to claim 1, wherein
the input information acquisition unit acquires one or more of the following: image data; an audio signal; textual information; or numerical information, and
wherein the field-image generation unit includes:
a generation unit that outputs, as an intermediate image, an image corresponding to the content of input information acquired by the input information acquisition unit; and
a synthesis unit that generates the field image by processing and then combining the intermediate image.

4. The information processing apparatus according to claim 1, wherein
the input information acquisition unit acquires an audio signal sampled through a microphone, and
wherein the field-image generation unit includes:
an audio/image converter that generates an image of an audio characteristic figure in which a plurality of coordinates representing sampled audio signals are connected with a straight line, represented in polar coordinates where a sampling time and an audio level are expressed as an angle θ and a radius r, respectively, when a predetermined cycle is specified to be 2π;
an event-image generator that detects a generation of an event when the shape of the audio characteristic figure satisfies a predetermined condition and outputs an event image associated with the event; and
a synthesis unit that synthesizes images so that the event image is incorporated in the field image.

5. The information processing apparatus according to claim 4 wherein the event-image generator detects a generation of a plosive sound when both the length of a side in the transverse direction of a rectangle circumscribed around the audio characteristic figure and a ratio of the length of a side in the longitudinal direction to the side in the transverse direction are larger than a set of threshold values that are respectively set.

6. The information processing apparatus according to claim 1, wherein
the input information acquisition unit acquires numerical information that shows the value of an atmospheric pressure that is acquired via a network, and
wherein the field-image generation unit includes:
an information/image converter that generates a gradation image with a gradient in pixel value that varies according to the value of the atmospheric pressure; and
a synthesis unit that synthesizes an image so that the gradation image is incorporated in the field image.

7. The information processing apparatus according to claim 1, wherein
the input information acquisition unit acquires image data of a captured image of the movement of an object, and
wherein the field-image generation unit includes:
a foreground-image generator that generates a foreground image in which different predetermined pixel values are assigned to a pixel included in an area of the object extracted by performing a foreground extraction process on the acquired image data and to a pixel included in the other area; and
a gravity-image generator that generates a height image in which the area of the object is designed to be lower than the other area by converting the pixel value of the foreground image into height information and that generates the field images in which a velocity vector and an acceleration vector generated on the premise that a gravity field is in the space of the height image are the pixel values.

8. The information apparatus according to claim 7, wherein the field-image generation unit further includes:
a motion-difference-image generator that acquires, as a motion area of the object, an area where a difference is generated by generating a difference image between a current image and an image that is earlier by a predetermined number of frames included in the acquired image data and that generates, as a field image of a friction field for reducing the velocity and the acceleration in the motion area, a motion difference image in which different predetermined pixel values are assigned to a pixel included in the motion area where the difference is generated and to a pixel included in the other area.

9. The information apparatus according to claim 8, wherein the field-image generation unit further includes:
a processing image generator that generates a gradation image in which a pixel value changes from the top to the bottom of a screen when a condition under which the object is determined to have no movement is satisfied for a predetermined amount of time in the difference image generated by the motion-difference-image generator, wherein
the gravity-image generator generates a height image in which the height goes down from the top to the bottom of the screen by converting the pixel value of the gradation image instead of the foreground image into height information.

10. The information processing apparatus according to claim 7, wherein:
the input information acquisition unit further acquires an audio signal sampled through a microphone; and
wherein the field-image generation unit further includes:
an audio/image converter that generates an image of an audio characteristic figure in which a plurality of coordinates representing sampled audio signals are connected with a straight line, represented in polar coordinates where a sampling time and an audio level are expressed as an angle θ and a radius r, respectively, when a predetermined cycle is specified to be 2π;

the event-image generator that detects generation of a plosive sound when both the length of a side in the transverse direction of a rectangle circumscribed around the audio characteristic figure and a ratio of the length of a side in the longitudinal direction to the side in the transverse direction are larger than a set of threshold values that are respectively set and that outputs a plosive-sound generation image in which a velocity vector and an acceleration vector that are directed outward in a radial manner from a foreground area in the foreground image are the pixel values; and a synthesis unit that synthesizes images so that the plosive-sound generation image is incorporated in the field image.

11. The information processing apparatus according to claim 1, wherein the field-image generation unit uses a particle image rendered by the particle rendering unit to generate the field image at a subsequent time step.

12. The information processing apparatus according to claim 1, wherein the input information acquisition unit acquires textual information that indicates weather that is acquired via a network, and the field-image generation unit includes:

an information/image converter that generates, as a field image of a color field that determines the color of a particle, an image filled with a color corresponding to a weather type.

13. The information processing apparatus according to claim 1, wherein the input information acquisition unit acquires numerical information that shows an atmospheric pressure that is acquired via a network, and wherein the field-image generation unit includes:

an information/image converter that generates, as a field image of a size field that determines the size of a particle, an image in which all pixels have a pixel value having an amount that is inversely proportional to the value of the atmospheric pressure.

14. The information processing apparatus according to claim 1, wherein the particle rendering unit acquires the attribute value of a particle by mapping a field image in a screen coordinate system in which the particle is rendered.

15. The information processing apparatus according to claim 14, wherein the particle rendering unit is configured with a graphics processing unit and maps the field image in a screen coordinate system by a texture lookup process.

16. An information processing method of outputting image data where a particle is time-varied comprising:

acquiring time-varying input information;

generating, based on the input information, a field image in which a distribution of an attribute value for an attribute to be assigned to a particle is expressed in a two-dimensional space in which a particle exists for a predetermined timestep and storing the field image in a memory; and acquiring the attribute value of a particle from a field image read out from the memory based on a positional coordinate of the particle at a given timestep and rendering the particle at a subsequent timestep in accordance with the attribute value.

17. A computer program embedded in a computer readable medium, for outputting image data where a particle is time-varied, comprising modules of:

acquiring time-varying input information;

generating, based on the input information, a field image in which a distribution of an attribute value for an attribute to be assigned to a particle is expressed in a two-dimensional space in which a particle exists for a predetermined timestep and storing the field image in a memory; and acquiring the attribute value of a particle from a field image read out from the memory based on a positional coordinate of the particle at a given time step and rendering the particle at a subsequent timestep in accordance with the attribute value.

18. A non-transitory computer-readable recording medium having embodied thereon a computer program product for outputting image data where a particle is time-varied, comprising modules of:

acquiring time-varying input information;

generating, based on the input information, a field image in which a distribution of an attribute value for an attribute to be assigned to a particle is expressed in a two-dimensional space in which a particle exists for a predetermined timestep and storing the field image in a memory; and acquiring the attribute value of a particle from a field image read out from the memory based on a positional coordinate of the particle at a given time step and rendering the particle at a subsequent timestep in accordance with the attribute value.

* * * * *